Nov. 26, 1940.  H. FRIEMEL  2,223,033
STRIP FEEDING FOR SOUND AND SOUND PICTURE SYSTEMS
Filed April 9, 1937   3 Sheets-Sheet 1
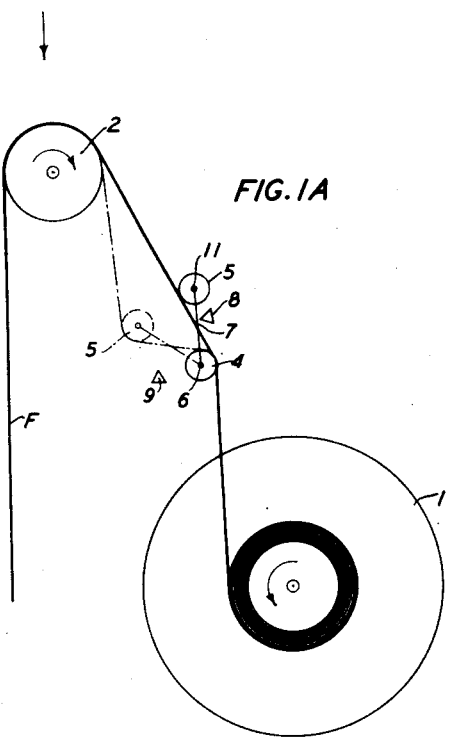
FIG. IA
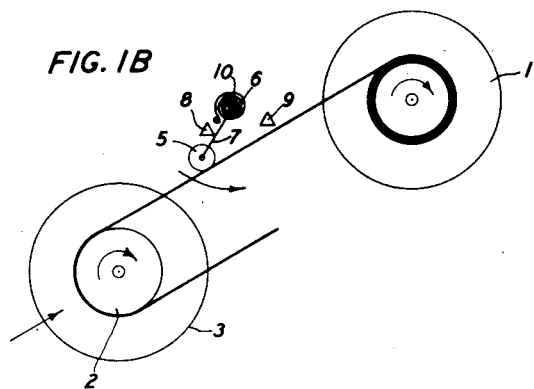
FIG. IB
INVENTOR
H. FRIEMEL
BY
ATTORNEY Nov. 26, 1940. H. FRIEMEL 2,223,033
STRIP FEEDING FOR SOUND AND SOUND PICTURE SYSTEMS
Filed April 9, 1937 3 Sheets-Sheet 2

INVENTOR
H. FRIEMEL
BY
G. H. Heydt
ATTORNEY

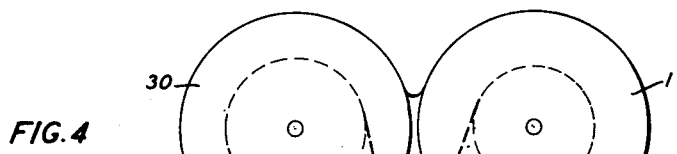

Patented Nov. 26, 1940

2,223,033

UNITED STATES PATENT OFFICE 2,223,033

STRIP FEEDING FOR SOUND AND SOUND PICTURE SYSTEMS

Hans Friemel, Berlin, Germany, assignor to Klangfilm Gesellschaft mit beschrankter Haftung, Berlin, Germany, a German company Application April 9, 1937, Serial No. 135,956
In Germany April 30, 1936

5 Claims. (Cl. 271—2.3)

This invention relates to film feeding devices for sound and sound picture systems in which the take-up reel is initially driven before the other film feeding devices.

The invention provides an arrangement of apparatus for initially operating the take-up reel and for starting other film feeding devices by a switch associated with the film which is operated when the film is being wound properly on the take-up reel and for stopping the operation of the other film feeding devices whenever proper winding of the film on the take-up reel ceases.

The application of devices according to the invention to sound and sound picture apparatus is of particular advantage in suppressing velocity variations produced by the uneven load in winding the film on the take-up reel. Many forms of friction clutches have been developed for the take-up reel in an effort to minimize these variations as the diameter of the film on the reel becomes greater and the film load changes but this is a difficult problem where the take-up reel and other film feeding devices are driven by the same motor. It is further true that regardless of the devices used there are inherent difficult obstacles to overcome in suppressing the film load variations ordinarily produced in taking up the film and while the separate drive for the take-up reel is one solution there are additional problems which present themselves in controlling two film drives. Assuming, for example, that an electric motor is used for separately driving the take-up reel, means must be found for controlling the successive starting of two motors in a manner to have the film take-up and the film feeding properly related. The take-up reel motor should not cause the film to be taken up too rapidly before the second motor is started but also the film must assuredly be winding properly on the reel before the second motor is started. During the following period when these motors are coming up to normal running speed there is ordinarily a tendency toward what is termed motor hunting and, consequently, the motor design and the time functions of the controlling switches must be such as to prevent hunting between motors. Also during this period and later, when the film is fed at normal velocity, the speed of the take-up reel motor must be regulated entirely by the load thereon. This load is considered as a single factor but is actually composed of the take-up film load which is variable, a constant load placed on the film by the film feeding sprockets and a secondary variable load which must be placed on the film through an elastic member preferably associated with mechanism for operating electrical contacts. With a separate drive a solution of this problem is possible only if the mechanical and/or electrical characteristics of the take-up reel motor, elastic member and controlling devices are properly coordinated.

The object of this invention is therefore to provide an accurate and economical means whereby the operation of the separate units is properly controlled to substantially eliminate the uneven load of the take-up reel and to provide a safety device at all times for stopping the film feeding devices whenever various well-known film feeding troubles are encountered, such for example as a break in the film.

In one embodiment of the invention one motor is used for operating the take-up reel and a second motor is used for operating the remaining film feeding devices of the sound picture system. The take-up reel motor is started by a manually operable switch and the second motor is started by a film operated switch located between the last film feeding roller and the take-up reel. The action of the latter switch is such that when a certain film length is reached between the roller and the take-up reel the driving motor for the roller is started. The take-up reel motor as later described may be of a type which responds as to speed in accordance with the load placed thereon and thus may be carefully regulated by the load as the motor which drives the film feeding devices comes up to speed. An elastic member associated with the film operated switch assists in the control of the take-up reel motor. At any time that the film is not being wound properly upon the take-up reel the film length between the last feeding roller and the take-up reel becomes greater causing the switch to operate in the reverse direction for opening the electrical circuit for the second motor. This also becomes a safety factor to prevent trouble in the case of a broken film or when other well-known difficulties occur.

The invention will be better understood from the following description taken in combination with the accompanying drawings.

In the illustrated embodiment, Figs. 1A and 1B illustrate the principle involved in the invention;

Figs. 4 and 5 illustrate a sound recorder having one form of the film controlled switch therein.

Fig. 7 shows structural details of the apparatus shown in Fig. 4.

Figure 2:
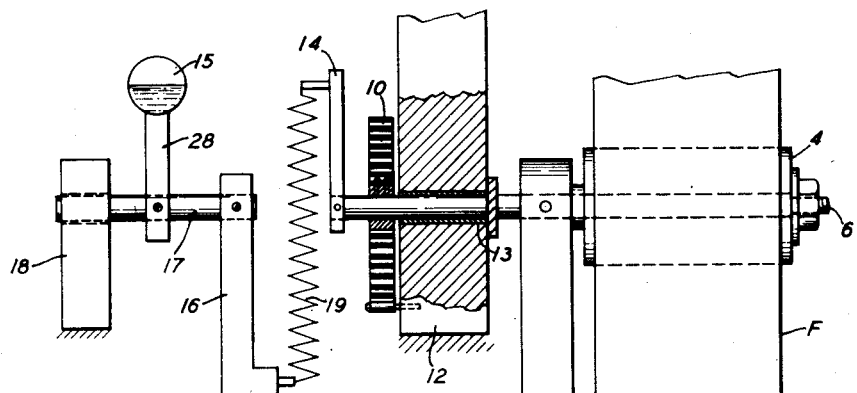
Figs. 2 and 3 illustrate an arrangement of the invention using mechanical devices to prevent hunting in the motor controlled by the switch, Fig. 2 being partly in section, and Fig. 3 being in perspective.
Figure 6:
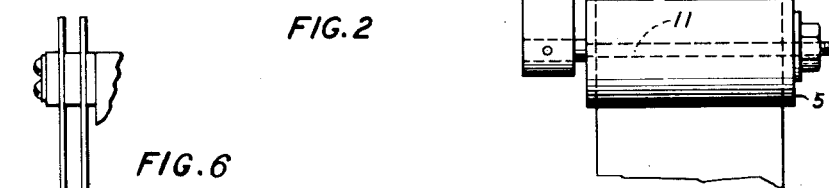
Fig. 6 shows the operating mechanism of Fig. 3 applied to an alternative type of switch.

In Fig. 1A the take-up reel 1 is driven by one electric motor and the roller or sprocket 2 is driven by a second electric motor. The film F is wound on the take-up reel in the direction indicated by the arrow. Between the take-up reel and the film driving roller 2, the film passes two rollers 4 and 5. The roller 4 is spatially fixed and rotated around the shaft 6. The shaft 6 has a roller 5 associated therewith through the lever arm 7, the roller being able to rotate freely on its shaft 11, which is connected to the lever arm 7. The positions of the roller 5 and lever arm 7 depend upon the length of film loop between the take-up reel 1 and the driving reel 2. The roller 5 may assume various positions as lever 7 swings about the axis 6 of the roller 4 between the limit of stops 8 and 9. This movement of lever 7 as controlled by the film is employed for operating an electric switch.

Fig. 1B illustrates another simple embodiment of the invention. The take-up reel is likewise denoted by 1 and the film feeding roller by 2, as in Fig. 1A. The roller 5 is secured to the lever arm 7 which is rotatable about the shaft 6. When the film loop increases, the roller 5 and lever arm 7 move in the direction of the arrow between the stops 8 and 9. This motion can again be utilized for the operation of an electric switch. When the film loop is increased, the roller 5 follows the film under the control of a spring 10, which exerts a force on lever arm 7 contrary to the force exerted by the film through the roller 5. This spring is not shown in Fig. 1A but may be used in the combination to position the rollers or it may be replaced by any other well-known means to produce this effect, for example, by a weight.

Figure 3:
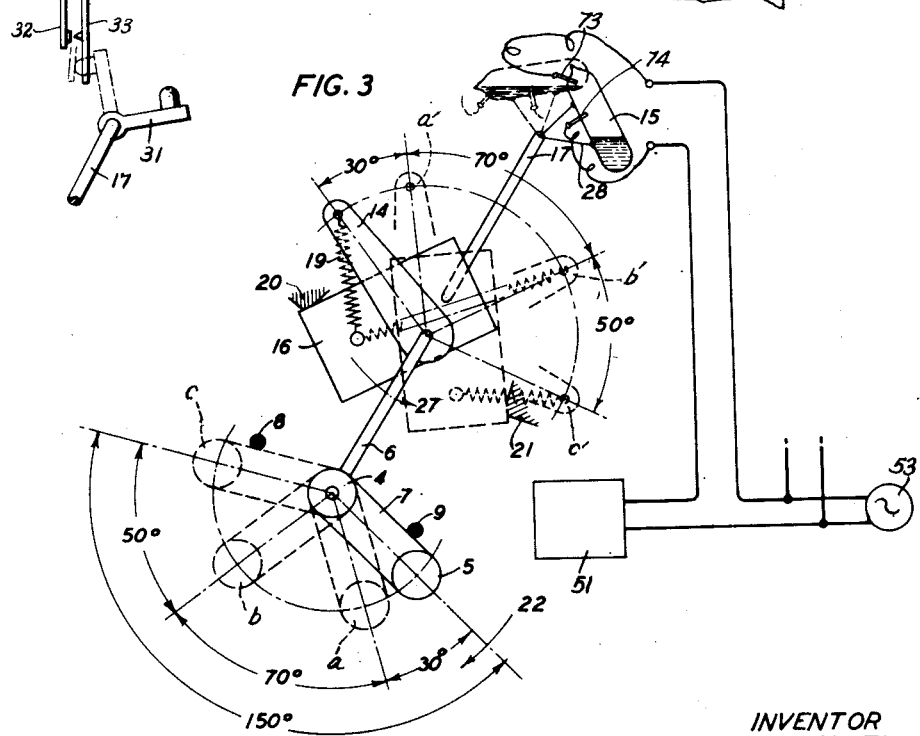

In Figs. 2 to 5 the switch contacts are shown in combination with mechanical devices for starting and stopping the motor, whereby after starting the motor, considerable variation in the tightness of the film is permitted before again stopping the motor. This provides an elastic member between the film feeding roller 2 and the take-up reel and also prevents hunting which might occur with the arrangement shown in Figs. 1A and 1B. Consideration of this condition will expedite the understanding of the arrangement shown in Figs. 2 and 3, for example, if the motor for the take-up reel 1 is started, the film F will be shortened and the lever arm 7 will press against the stop 8. In this position an electric contact is actuated for starting the motor for driving roller or sprocket 2. If immediately thereafter the length of film between roller 2 and the take-up reel 1 would become somewhat greater, the motor for the roller 2 would be stopped. The take-up reel motor would then again shorten the film loop which would again operate the switch for starting the motor. Hence hunting effects may occur, which are positively eliminated by the invention as arranged in Figs. 2, 3, 4 and 5. In Figs. 2 and 3 corresponding parts are designated by the same reference numerals as in Figs. 1A and 1B. The arrangement of the circuit and film driving mechanism including the motors may be as shown in Figs. 4, 5 and 7. In the latter figures the path of the film may be traced from the delivery reel 30 to the lower sector of driving sprocket 2, guide rollers 38 and 39, sound roller 40, upper sector of driving sprocket 2, over roller 5 and under roller 4 of the switching mechanism, and thence to the take-up reel 1. Motor 60 is shown for driving the take-up reel 1 through suitably disposed gears and a chain drive as disclosed in Fig. 5. Motor 61 is shown for driving the film feeding mechanism through shaft 62 and an appropriate set of gears, shown in Fig. 7. Referring to Fig. 7 it may be seen that shaft 62 drives a worm 70 cooperating with a worm wheel 71 mounted on a countershaft 72. The shaft 72 supplies rotary power to sprocket 2 which is rigidly secured thereto. A source of current 53 is connected to the switching circuit arranged with a manually operable switch 50 for actuating motor 60 and a film operable switch 45 for actuating motor 61. The switch 45 is a modification of the switch shown in Figs. 2 and 3 and will be described after an understanding of the switching mechanism of Figs. 2 and 3 has been given.

In Figs 2 and 3 the roller 4 is arranged to freely rotate on the shaft 6. The lever arm 7 is rigidly fastened to the shaft 6 and also supports a spindle 11 on which the roller 5 may revolve freely. As shown in Fig. 2 the film passes under the roller 5 and over the roller 4. The shaft 6 is held by a standard 12 fastened to the frame of the recorder and can freely rotate in a bearing 13 mounted in this standard. At the other side of the standard there is arranged a spiral spring 10 with its inner end rigidly connected to the shaft, while its outer end is attached to the standard 12. This spring tends to turn the roller 5 against the force exerted on the latter by the film. Lever arm 14 is rigidly connected to the extreme end of shaft 6. The switch arms 16 and 28 are rigidly fastened to shaft 17. The switch 15 shown as a mercury switch is held in a position by arm 28 which allows it to turn with the shaft 17 for closing and opening its contacts. The shaft 17 rotates in the standard 18, which is fastened to the frame. According to the foregoing, it is apparent that the roller 5 may swing about the axis of shaft 6 under the control of the film loop and thus rotate shaft 6 and lever arm 14. In order to convert the rotary movements of the control shaft 6 into intermittent switching movements of the shaft 17, the two levers 14 and 16 are connected by a spring 19. As will be explained in the following, when the rotary movement of the shaft 6 is clockwise, the rotary movement of the shaft 17 is counter-clockwise. This will be better understood by referring to Fig. 3. It may be assumed that with both motors stationary, the arm 7 rests against the stop 9 and the switching lever 16 rests against the stop 20. When the motor 60 for the take-up reel 1 is started by the operation of manual switch 50 shown in Fig. 4, the film shortens itself and the roller 5 moves in the direction of the arrow 22 into position a. By this rotation the lever 14 moves into the position a'. The spring 19 which connects the two lever arms 14 and 16 is tensioned but the lever arm 16, which is rigidly connected to shaft 17, cannot rotate in the direction of the spring pull on account of stop 20. With the further rotation of the roller 5 in the direction of the arrow 22, the position b is reached.

At the same time the lever 14 reaches the position b'. At this moment the spring 19 is tensioned with maximum force as shown in Fig. 3. Now if the lever 14 is moved only a trifle beyond the position b', the switch arm 16 is moved in the direction of the arrow 27 under the force of the spring 19. The switch arm 16 rotates to the stop 21 and in doing so rotates the shaft 17 and the member 28, which has the mercury switch 15 mounted thereon. The rotation of the shaft 17 will thus cause the mercury switch 15 to complete the circuit for starting the driving motor 51. This circuit extends from the source of power 53 through a flexible lead wire attached to electrode 73, a body of mercury (which has now assumed a position so as to cover electrodes 73 and 74), electrode 74 operating windings of motor 51, and thence by return conductor to the power source 53. The starting of the driving motor 51 for sprocket 2 may momentarily increase the size of the film loop and thus move the roller 5 contrary to the direction of the arrow 22 out of position b. This movement, however, does not bring about a change in position of the switch 15. As illustrated in the drawings, it is necessary for the roller 5 and the lever 14 to rotate through an arc greater than 70 degrees to again change the position of the switch arm 16 for opening the switch contacts which would stop the motor 51. There is thus a time interval between the point-to-point movement of the lever 14 and the point-to-point movement of the switch arm 16. As the motor 51 comes up to speed, the roller 5 is slowly moved out of the position b in the direction of the arrow 22 toward the position c. The roller 5 may move in this direction until the lever arm 7 meets the stop 8. Since the lever arm 14 is rigidly connected to the shaft 6, it moves to position c' when the roller 5 moves into position c. It is possible to change these limits by changing the position of stop 8.

As herein set forth a spring 10 is introduced in the switch between the roller 2 and the take-up reel. This spring not only serves in the proper operation of the switch members but acts in the capacity of an elastic load to assist in balancing the driving torque of motor 60 as the film load changes and assists in the control of the speed of this motor. The motor 60 for rendering this character of service may be a small three-phase induction motor designed to permit slip between the rotating field and the armature in order that its speed may be regulated within desired limits by the load. In order to produce the desired regulation, the torque of motor 60 may be about equal or slightly greater than required to carry the normal load with the film roll diameter small and the roller 5 in position b, the spring 10 being tensioned accordingly. When the take-up reel is required to run at a lower speed an increased tension of spring 10 is used to balance the torque of motor 60 and consequently cause a greater slip between the field and armature.

A three-phase motor is of course only one of many varieties of motors which may be designed to function properly in this service.

If we now assume that the take-up reel motor 60 no longer functions properly or that some defect arises in the winding operation, the film loop will at once become greater, which causes a movement of the roller 5 toward its normal position. The roller 5 moves under the control of the film from position c to position b and into position a. This causes the lever arm 14 to also move into position a'. Not until this position is reached will the spring 19 between the lever arm 14 and switch arm 16 cause the switch arm 16 to be rotated back to the stop 20. There is consequently a minimum rotation of approximately 72 degrees before the switch is opened. The movement of the switching arm 16 rotates the shaft 17 in a clockwise direction, thereby opening the contacts of switch 15 to stop the motor 51.

The switch 45 shown in Fig. 4 operates in the same manner and on the same principle as that shown in Figs. 2 and 3 with the exception that a contact switch is substituted for the mercury switch and a switch operating arm 31 is substituted for the arm 28. Arm 31 cooperates with mechanical contacts 32 and 33 which are normally maintained in an open position by virtue of the resilience of spring member 33. Obviously, these mechanical contacts will be closed and opened with the same timing and with the same snap action which occurs when the mercury switch is used. It will be noted that the rollers and lever arms bearing the same numerals as Figs. 2 and 3 are shown in the same relation. When the lever arm 14 has rotated through an arc of over 100 degrees, switch arm 16 is moved by the pull of spring 19 to the stop 21 for causing closure of contacts 32 and 33 to start the motor 51 over a circuit identical with that previously described for the mercury switch except that in this instance, the mechanically operated contacts replace the electrodes bridged by the fluid mercury. Switch arm 31 is retracted in the same manner as arm 28 and in this case opens contacts 32 and 33 to stop motor 51.

It is not the intention to limit the invention to the specific embodiment disclosed since it can be used in many ways for operating or switchng apparatus electrically according to the condition of a film loop. For example, a single motor may be used which may initially drive the take-up reel and also drive the other film feeding devices through a mechanical or magnetic coupling which is operated under the control of the film actuated switch.

What is claimed is:

1. In a strip feeding system, a strip-pulling device, a motor for driving said strip-pulling device, a second motor for driving other strip feeding mechanism, a switch for starting the strip-pulling device motor, and a second switch between the feeding mechanism and the strip-pulling device operated by the action of the strip in passing to the strip-pulling device for starting said second motor.

2. In a strip feeding system, a strip-pulling device, a motor for driving said strip-pulling device, a second motor for driving other strip feeding mechanism including a feeding roller, a switch for starting the strip-pulling device motor and a second switch between the feeding roller and the strip-pulling device operated by the strip in passing to the strip-pulling device for starting and stopping said second motor.

3. In a strip feeding system having one motor for driving a strip-pulling device and a second motor for driving other strip feeding mechanism including a feeding roller, a switch for starting the strip-pulling device motor, electrical switching contacts for controlling the second motor, and a toggle switch arm actuated by the strip in passing to the strip-pulling device for closing and opening said contacts.

4. In a strip feeding system having one motor for driving a strip-pulling device and a second motor for driving other strip feeding mechanism including a feeding roller, a switch for starting the take-up reel motor, electrical switching contacts for controlling the second motor, a toggle switch arm for closing and opening said contacts, and a guide roller mounted on a lever arm rotatable by the action of the strip in passing to the strip-pulling device for operating said switch arm.

5. In a strip feeding system, a strip-pulling device, a motor for driving said strip-pulling device, a second motor for driving other strip feeding mechanism including a feed roller, a switch for starting the strip-pulling device motor and a film operated switch for controlling the other motor positioned between said feed roller and the strip-pulling device comprising switching contacts, a lever arm moved by the feeding of the strip to the strip-pulling device, and a switch arm moved by the lever arm for actuating said contacts.

HANS FRIEMEL.